June 17, 1924.
W. H. APPLEBY
BUFFER
Filed Feb. 19, 1923    2 Sheets-Sheet 1
1,497,748
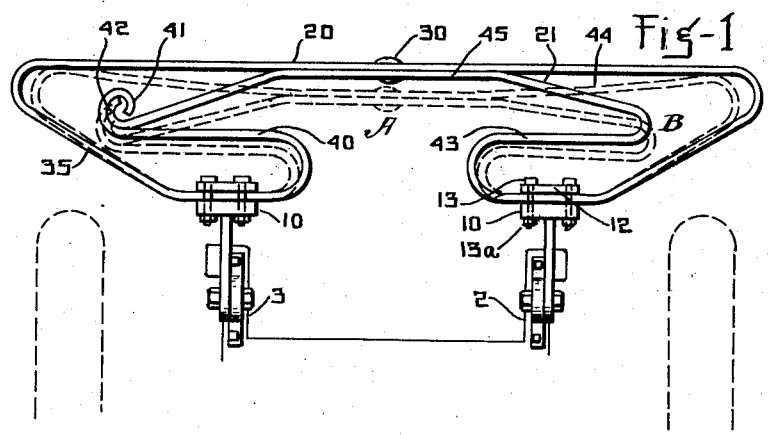
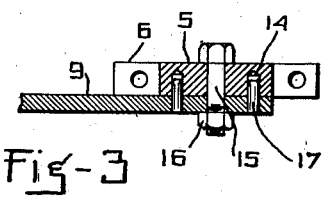
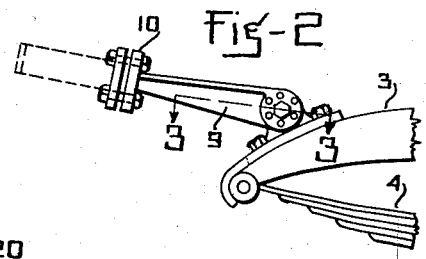
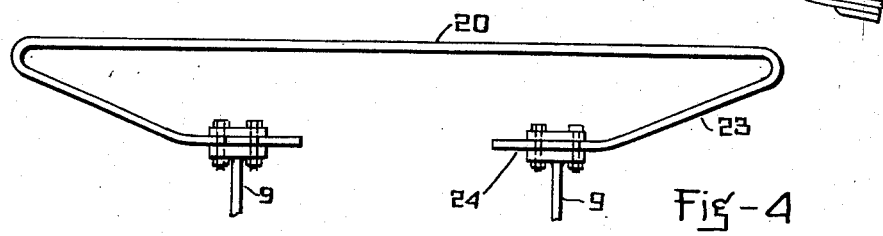
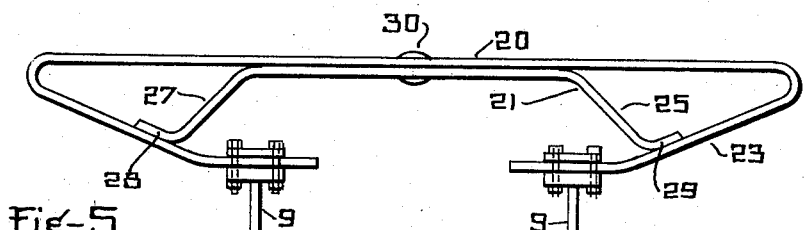
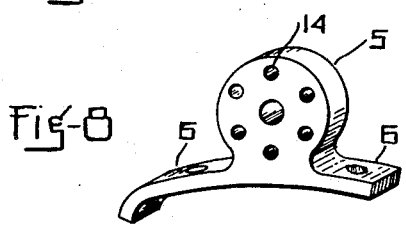
Inventor
William H. Appleby
Attorney Patented June 17, 1924.

1,497,748

UNITED STATES PATENT OFFICE.

WILLIAM HENRY APPLEBY, OF MONTREAL, QUEBEC, CANADA.

BUFFER.

Application filed February 19, 1923. Serial No. 620,083.

*To all whom it may concern:*

Be it known that I, WILLIAM HENRY APPLEBY, resident of the city of Montreal, Province of Quebec, Dominion of Canada, a subject of the King of Great Britain, have invented certain new and useful Improvements in Buffers; and I do hereby declare that the following is a full, clear, and exact description thereof.

My invention relates particularly to spring buffers or what are more commonly termed bumpers for motor vehicles.

The object of the invention is to provide a buffer of this type in which the shock of impact will be more evenly distributed or dissipated throughout its mass than has been possible with buffers heretofore in use, thereby protecting individual parts of the vehicle and buffer from excessive strain and consequently reducing the danger of breakage to a minimum.

A further object is to provide a buffer which is of comparatively simple and inexpensive construction, which can be readily applied to vehicles of different types and varying sizes without alteration and in which a high degree of resiliency is combined with great strength and durability.

Some of the salient features of my invention are:

(a) A transverse member with inwardly and rearwardly bent end portions presenting attachment portions which adapt the buffer to any size of vehicle and inclined or tapered buffer ends which provide ample clearance for the wheels of the vehicle and obviate the danger of entanglement with adjacent vehicles which is frequently experienced with the usual hook shaped bumper end;

(b) An internal member bearing between the main transverse member and the inwardly bent end portions and acting as a resilient intermediary therebetween reinforcing the main member and causing all parts of the buffer to be brought into play in the dissipation of shock;

(c) An adjustable mount enabling the buffer proper to be raised or lowered relatively to the chassis to meet requirements.

For full comprehension however, of my invention, reference must be had to the accompanying drawings in which similar reference characters indicate the same parts, and wherein:

Figure 1 is a plan view of my improved buffer in position upon the front of a vehicle, the position of the buffer under shock being indicated in dotted lines;

Figure 2 is an end elevation thereof;

Figure 3 is a detail sectional view taken on line 3—3 Figure 2;

Figure 4 is a detail view of the buffer in its most simplified form without the internal member;

Figures 5, 6 and 7 illustrate modified forms of my improved buffer;

Figure 8 is a detail view of one of the supporting brackets.

Figure 6:
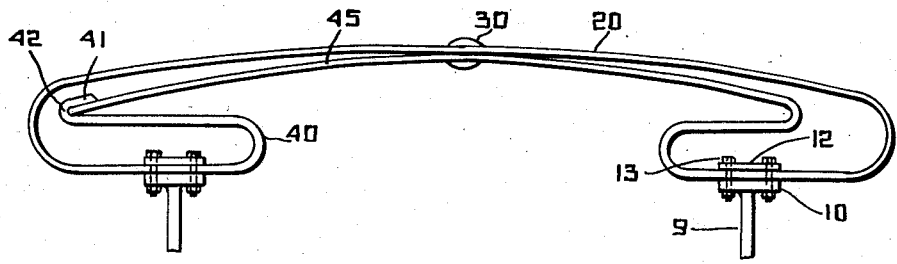

My improved bumper or buffer is equally effective whether mounted in front or in rear of the vehicle. In Figures 1 and 2 it is illustrated mounted in position in front of the vehicle, only those parts of the latter which are directly associated with the present invention being shown, namely the longitudinal side sills 2 and 3 of the vehicle's chassis and supporting springs 4.

Although any desired means may be employed in mounting the buffer upon the vehicle that which I find most preferable consists of disc-like brackets 5 having laterally extending lugs 6 which are rigidly bolted upon the forward ends of the side sills, and arms 9 of substantially T-form adjustably mounted upon the brackets and carrying the bumper at their free ends. These arms project to any desired extent forwardly of the side sills in alignment therewith and their free ends terminate in plate-like clamping members 10 of greater width than the width of the adjacent bumper parts, the latter being clamped thereon by clamping plates 12, bolts 13 and nuts 13ª.

The range of adjustment of each arm upon its bracket enables the bumper to be raised or lowered to position in which it will be most effective and in which it will leave untrammeled the adjacent parts of the vehicle. This adjustment is obtained by a plurality of equi-distantly spaced sockets 14 formed in each bracket concentrically to a central bolt or pin 15 which passes through each bracket and its respective arm and clamps the two together; and pins 17 rigidly mounted upon each arm in positions corresponding with those of the sockets and adapted to project thereinto. When it is desired to raise or lower the bumper the nuts 16 on the bolts 15 are removed or slackened and each arm is swung upon its bolt to the desired position after which the pins are reinserted in the sockets and the nuts 16 replaced and tightened.

Figure 7:
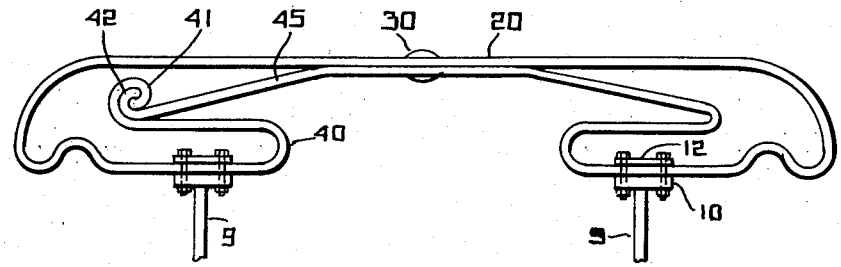

My improved buffer consists of a main cross-bar 20 of spring steel which is reinforced by an internal member 21 also of spring steel. This member may be formed in one piece with the main cross-bar as indicated in Figures 1, 6 and 7 or separately as in Figure 5 or where cheapness is of paramount importance it may be entirely eliminated as indicated in Figure 4. In the last mentioned construction the main length of the bar is as usual disposed transversely to the direction of travel of the vehicle and its ends are bent rearwardly and inwardly as at 23 at an oblique angle and terminate in straight attachment portions 24 disposed transversely in alignment with each other and perpendicularly to the arms 9. These attachment portions are clamped upon the adjacent ends of the arms by the clamping plates 12, bolts 13 and nuts 13ª, and each is of sufficient length to adapt the buffer to chassis of all standard sizes without alterations.

The tapered ends 23 not only assist materially in dissipating shock but also provide wheel clearance and avoid the possibility of vexatious entanglement with other vehicles which so frequently happens with buffers of the hook shaped type.

The internal member illustrated in Figure 5 bears between the main cross-bar and the inwardly turned portions 23 and acts as a resilient intermediary therebetween which not only reinforces the main member but in addition causes every part of the buffer to be brought into play in the dissipation of the shock. It is disposed parallel to and in intimate contact with the middle portion of the cross-bar for approximately one-half of the length of the latter and its ends extend therefrom in angular directions as at 26 and 27 into sliding frictional engagement with the inclined portions 23, the extreme ends 28 and 29 being bent to positions in which they will normally bear flat against the latter.

In order to secure the internal member in its position within the main cross-bar in such a manner that it will be untrammeled in its absorption of shock it is fastened at one point only as at 30, the fastening being accomplished by a spot weld or a bolt or rivet the latter having a rectangular shank snugly passing through a correspondingly shaped opening in the two members.

In Figures 1, 6 and 7 the invention is embodied in a buffer in which the internal member 21 is formed as an integral part of the main member 20, the buffer being constructed from a unitary strip of spring steel which is bent to the desired form. It will be noted that although the configuration of the main member 20 is slightly varied in these three figures the construction of the internal member and the manner in which it is united to and reinforces the main member is substantially the same in all three.

In each of these constructions the inwardly bent end 35 of the main buffing member 20 is bent forwardly and outwardly as at 40, the extreme end terminating in an abutment lip 41 which engages and retains in position the end 42 of the internal member. The opposite end of the buffing member is bent in a similar manner as at 43 but it is extended forwardly as at 44 in an angular direction into contact with the rear side of the middle portion of the buffing member finally terminating in the end 42 which is disposed at a corresponding angle to that of the part 44. If desired the bent portion 43 may also be provided with a lip similar to the lip 41 in which case the internal member consisting of the angular portions 42 and 44 and intermediate portion 45 would be constructed in a separate piece.

Under the shock of impact the buffer will assume the position indicated in dotted lines in Figure 1, the main cross-bar or buffing member being distorted to position indicated at A thereby exerting an inward pull upon its extreme ends, while simultaneously a combined rearward and outward thrust is exerted upon the portions 40 and 43 through the angular portions 42 and 44 as indicated at B causing all the parts of the buffer to come into play in dissipating shock, at the same time eliminating the danger of excessive strain on any individual part.

From the foregoing it will be readily seen that a buffer is obtained which possesses great strength and durability combined with a high degree of resiliency and which can be manufactured at minimum cost.

What I claim is as follows:

1. In a vehicle the combination with the chassis thereof, of a buffing member disposed transversely relatively thereto and means for adjustably mounting the member thereon, said means consisting of a pair of brackets rigidly mounted upon the chassis, each bracket having a plurality of equidistantly spaced sockets in circular arrangement and an arm adjustably mounted upon each bracket, each arm having a plurality of correspondingly arranged pins adapted to project into said sockets and snugly fit the same and means for clamping each arm upon its bracket with the pins projecting into their respective sockets, and means for securing the buffing member upon the said arms.

2. A buffer of the type described consisting of a straight resilient transverse impact member having each end bent rearwardly and inwardly and terminating in an elongated attachment portion disposed substantially parallel to the main length of the transverse member, that portion between the attachment portion and the transverse impact portion being disposed in a straight line at an oblique angle to the length of the impact portion.

3. A buffer of the type described consisting of a straight resilient transverse impact member having each end bent rearwardly and inwardly and terminating in an elongated attachment portion disposed substantially parallel to the main length of the transverse member, that portion between the attachment portion and the transverse impact portion being disposed in a straight line at an oblique angle to the length of the impact portion, and resilient means bearing between the main length of the transverse member, and the bent back portions.

4. A buffer of the type described consisting of a resilient transverse impact member having each end bent rearwardly and inwardly and terminating in an elongated attachment portion disposed substantially parallel to the main length of the transverse member, that portion between the attachment portion and the transverse impact portion being disposed in a straight line at an oblique angle to the length of the impact portion.

5. A buffer of the type described consisting of a resilient transverse impact member having each end bent rearwardly and inwardly and terminating in an elongated attachment portion disposed substantially parallel to the main length of the transverse member, that portion between the attachment portion and the transverse impact portion being disposed in a straight line at an oblique angle to the length of the impact portion, and resilient means bearing between the main length of the transverse member and the bent back portions.

6. A one-piece buffer of the type described consisting of a transverse impact portion having rearwardly and inwardly bent ends, one end being bent forwardly and outwardly, the last-mentioned outwardly projecting portion being disposed substantially parallel to the impact portion, the opposite end being bent forwardly outwardly in a similar manner to the first mentioned end but in addition being extended across into bearing relation with the first mentioned end and with the middle of such last-mentioned extension being bent towards the impact portion.

7. A one-piece buffer of the type described consisting of a transverse impact portion having rearwardly and inwardly bent ends, one end being bent forwardly and outwardly, the last-mentioned outwardly projecting portion being disposed substantially parallel to the impact portion, the opposite end being bent forwardly outwardly in a similar manner to the first mentioned end but in addition being extended across into bearing relation with the first mentioned end and with the middle of such last mentioned extension bearing against the rear side of the impact portion and means for securing the said middle of the extension in position bearing against the impact member.

8. A one-piece buffer of the type described consisting of a transverse impact portion having rearwardly and inwardly bent ends, one end being bent forwardly and outwardly, the last-mentioned outwardly projecting portion being disposed substantially parallel to the impact portion, the opposite end being bent forwardly outwardly in a similar manner to the first mentioned end but in addition being extended across into bearing relation with the first mentioned end and with the middle of such last-mentioned extension being bent towards the impact portion, and means for interlocking the ends of the buffer.

9. A buffer of the type described consisting of a unitary strip of metal bent to form a straight resilient transverse impact portion having rearwardly and inwardly bent ends one end being bent forwardly and outwardly and the opposite end being bent forwardly and outwardly in a similar manner to the first mentioned end but in addition being extended across into bearing relation successively with the impact portion and the first mentioned end, those portions between the ends of the impact member and the forwardly and outwardly bent portions being disposed in straight lines at oblique angles to the length of the impact portion with their inner ends terminating in straight attachment portions disposed parallel to the impact portion.

10. A one-piece buffer of the type described consisting of a transverse impact portion having rearwardly and inwardly bent ends, one end being bent forwardly and outwardly, the last-mentioned outwardly projecting portion being disposed substantially parallel to the impact portion, the opposite end being bent forwardly outwardly in a similar manner to the first mentioned end but in addition being extended across into bearing relation with the first mentioned end, said extension comprising a middle portion disposed parallel to and bearing flat against the rear side of the impact portion and flanked by portions disposed in straight lines at oblique angles thereto.

In testimony whereof I have signed my name to this specification in the presence of two witnesses.

WILLIAM HENRY APPLEBY.

Witnesses:
 GORDON G. COOKE,
 IRENE CLORAN.